United States Patent [19]

Daboudet et al.

[11] Patent Number: 5,121,548
[45] Date of Patent: Jun. 16, 1992

[54] CONTOUR FOLLOWER DEVICE, IN PARTICULAR FOR EYEGLASS FRAMES

[75] Inventors: Pascal Daboudet, Bouffemont; Manuel Gallardo, Carnetin; Ahmed Haddadi, Savigny-sur-Orge, all of France

[73] Assignee: Essilor International Cie Generale d'Optique, Creteil, France

[21] Appl. No.: 592,323

[22] Filed: Oct. 3, 1990

[30] Foreign Application Priority Data

Oct. 6, 1989 [FR] France ................. 89 13079

[51] Int. Cl.$^5$ ............... G01B 7/28; G01B 5/20
[52] U.S. Cl. ........................... 33/507; 33/28; 33/200; 33/553
[58] Field of Search ............ 33/28, 507, 200, 543, 33/549, 551, 553, 554; 51/101 LG, 105 LG, 127; 351/204

[56] References Cited

U.S. PATENT DOCUMENTS

| 3,425,132 | 2/1969 | Kamm . | |
| 3,555,739 | 1/1971 | Novak | 51/101 LG |
| 3,786,600 | 1/1974 | Bloxsom | 51/127 |
| 4,051,601 | 10/1977 | Godot | 33/200 |
| 4,122,608 | 10/1978 | Hopf | 33/549 |
| 4,679,331 | 7/1987 | Koontz | 33/551 |
| 4,724,617 | 2/1988 | Logan et al. | 33/28 |
| 4,991,305 | 2/1991 | Saigo et al. | 33/507 |
| 4,995,170 | 2/1991 | Braé et al. | 33/200 |

FOREIGN PATENT DOCUMENTS

| 0181788 | 5/1986 | European Pat. Off. . | |
| 1051677 | 2/1959 | Fed. Rep. of Germany | 33/28 |
| 1623177 | 1/1971 | Fed. Rep. of Germany . | |
| 2633285 | 2/1977 | Fed. Rep. of Germany | 33/507 |
| 2614690 | 11/1988 | France . | |
| 2194053 | 2/1988 | United Kingdom . | |

Primary Examiner—William A. Cuchlinski, Jr.
Assistant Examiner—C. W. Fulton
Attorney, Agent, or Firm—Longacre & White

[57] ABSTRACT

A contour follower device suitable for reading off the contour of eyeglass frame rims or surrounds includes a support table with holding means for supporting the article whose contour is to be read off. A feeler has a rotatable contact head adapted to be applied to the article and is carried by a carriage which is movable relative to the support table. The contact head is rotated by rotational drive means such as a motor-gearbox unit.

17 Claims, 3 Drawing Sheets

CONTOUR FOLLOWER DEVICE, IN PARTICULAR FOR EYEGLASS FRAMES

BACKGROUND OF THE INVENTION

1. Field of the invention

The present invention is generally concerned with contour follower devices which can "read" any shape and is more particularly, but not exclusively, directed to reading off the contour of the rims or surrounds of any eyeglass frame for the purpose of trimming lenses to be fitted thereto.

For example, and equally non-exclusively, the present invention is directed to the case where polar coordinates are used and the contour follower device comprises a support table fitted with holding means adapted to support the article whose contour is to be read off and a feeler with a contact head to be applied to the article and carried by a carriage which can reciprocate along a straight line path on the support, with rotation means for relative rotation between the support table and the carriage support.

2. Description of the prior art

A contour follower device of this type is described in European Patent Application No 0 181 788, for example.

Although it has been proposed to mount the contact head of the feeler rotatably, it is usually fixed.

This is the case in the above-mentioned European Patent Application No 0 181 788.

With currently known contour follower devices of this kind it is not rare for malfunctions to occur due to localized jamming of the feeler against the article whose contour is to be read off, especially if this contour has very tight corners, as can be the case with the rims or surrounds of some eyeglass frames.

This risk is accentuated if the contact pressure between the feeler and the article is high, as can be the case if it is produced by a spring whose tension varies with its length, as in European Patent Application No 0 181 788.

A general object of the present invention is to provide a very simple way of circumventing these disadvantages.

SUMMARY OF THE INVENTION

The present invention consists in a contour follower device comprising a support table, holding means on said support table for supporting an article whose contour is to be read off, a feeler, a carriage carrying said feeler and movable relative to said support table, a rotatable contact head of said feeler and drive means for rotating said contact head.

In practice, the drive means is usually a motor or, to be more precise, a motor-gearbox unit carried by the carriage.

Experience has shown, somewhat surprisingly, that the rolling contact between the feeler and the article whose contour is to be read off is sufficient to eliminate any risk of jamming between them.

According to another feature of the invention, if polar coordinates are used, the carriage carrying the feeler is movable along a straight line path on a support, and rotation means are provided for relative rotation between the carriage support and the support table, the presence of the motor may be exploited to reduce the rotation means operative between the support and the support table to simple rolling means.

Experience shows that the effect of the rolling contact between the contact head of the feeler and the article whose contour is to be read off is sufficient to bring about the necessary rotation between the support table and the carriage support.

However, a specific motor for imparting this rotation may be provided if required.

The presence of the motor for rotating the contact head may further be exploited to drive the feeler along its axis through a clutch.

This advantageously facilitates bringing the contact head into contact with the article whose contour is to be read off.

According to another characteristic of the invention the carriage carrying the feeler is engaged with a guide fastened to its support and carries, parallel to this guide, at least one rack meshing with a pinion rotatably mounted on said support and rotated by the output shaft of a motor through a transmission incorporating a torque limiter.

This torque limiter may be a simple magnetic clutch, for example.

By virtue of the torque limiter it is possible to limit to the required value the contact pressure between the feeler and the article whose contour is to be read off.

Advantageously, it is then sufficient to reverse the direction of the motor concerned to reverse the direction in which pressure is applied to the article whose contour is to be read off, so that the contour follower device in accordance with the invention can be used whether the article whose contour is to be read off is one of the rims or surrounds of an eyeglass frame or a template.

The characteristics and advantages of the invention will emerge from the following description given by way of example only with reference to the appended diagrammatic drawings.

DETAILED DESCRIPTION OF THE INVENTION

Figure 1:
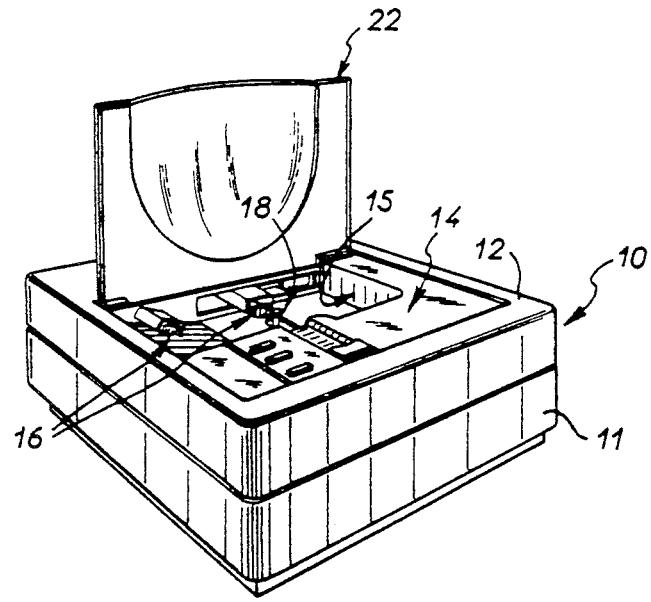
FIG. 1 is a perspective view of a contour follower device in accordance with the invention with the lid raised.

As shown in the figures, the contour follower device in accordance with the invention comprises a casing 10 with a body 11 and a top cover 12, a frame 13 attached to the body 11 of the casing 10, a support table 14 in which is an opening 15 and which is equipped with holding means 16 adapted to support above the opening 15 the article whose contour is to be read off, and a feeler 18 adapted to be applied to this article through the opening 15 and equipped with a rotatable contact head 19 carried by a carriage 20 which is mobile relative to the support table 14 with a reciprocating movement along a straight line path on a support 21. As will be explained in more detail later, the contour follower device uses polar coordinates and includes rotation means for relative rotation between the support table 14 and the carriage support 21.

A lid 22 pivoted to the top cover 12 of the casing 10 provides access to the opening 15 in the support table 14 within which the holding means 16 operate.

As the support table 14 does not of itself form part of the present invention it will not be described in more detail here.

Suffice to say that the holding means 16 are of the kind described in U.S. patent application Ser. No. 448,633 filed Dec. 11, 1989.

Generally speaking, the contour follower device in accordance with the invention will not be described in complete detail.

For reasons of simplicity only the parts needed to understand the invention will be described here.

In accordance with the invention, the contact head 19 of the feeler 18 is rotated by rotational drive means.

The contact head 19 is fastened to a shaft 24 rotated by the output shaft 25 of a motor, to be more precise a motor-gearbox unit 26 constituting the rotational drive means and carried by the carriage 20.

The support table 14 is carried by a plate 27 of the frame 13 parallel to the bottom of the body 11 of the casing 10. It is fixed whereas the support 21 for the carriage 20 can rotate relative to the frame 13.

The support 21 comprises a generally circular plate 28 with a groove 29 in its edge through which it cooperates with at least three rollers 30 rotatably mounted on the frame 13 and spaced along its periphery, for example at 120° in pairs.

The plate 28 and therefore the support 21 as a whole are therefore suspended, so to speak, from the frame 13 by the rollers 30 and by means of a circular opening 31 in the plate 27 surrounding the opening 15 in the support table 14.

The plate 28 has a central part 32 made from a synthetic material to reduce its weight, among other reasons. From its lower surface is suspended, as will be described in more detail later, the carriage 20 carrying the feeler 18 and, surrounding a rim 33 on the central part 32, a peripheral part 34 which is made from metal for greater stiffness and on which is provided the groove 29 cooperating with the rollers 30.

The transverse cross-section of the groove 29 is trapezium-shape. The rollers 30 have the usual rectangular cross-section.

Each roller 30 therefore contacts the plate 28 at two points only.

The rollers 30 and the groove 29 on the plate 28 form rolling means operative between the support table 14 and the support 21 for the carriage 20.

An encoder disk 35 is attached to the plate 28 and cooperates with a sensor 36 to give a reading of its angular position.

The feeler 24 projects into the opening 15 in the support table 14 through a radial slot 37 in the central part 32 of the plate 28.

In order to suspend it from the plate 28, the carriage 20 carrying the feeler 18 is engaged with a guide 39 fastened to the bottom surface of the central part 32 of the plate and therefore the support 21 of which it forms part.

The guide 39 comprises two parallel angle-iron rails 40 formed with a groove in which is secured a circular cross-section bar 42. The carriage 20 is located between the rails 40 and cooperates with them through rollers 41.

The carriage 20 comprises a body 43 carrying the rollers 41 and, in the body 43, a bracket 44 carrying the motor-gearbox unit 26 and therefore the feeler 18. In a manner described in U.S. patent application Ser. No. 187,010 filed Apr. 27, 1989 now abandoned, there are operative between the body 43 and the bracket 44 two parallel but different length linkages 45A, 45B which are parallel to the guide 39 to enable the bracket 44 to move transversely relative to the guide 39 to enable the feeler 18 to follow the rim or surround of an eyeglass frame when the article whose contour is to be read off is an eyeglass frame.

As these arrangements do not of themselves form part of the present invention they will not be described in more detail here.

The carriage 20 carries at least one drive rack 47 parallel to the guide 39.

Here it carries two such racks 47, symmetrically disposed relative to the feeler 18, formed by right-angle flanges in one piece with the sides of the body 43.

Each rack 47 meshes with a pinion 48 rotatably mounted on the support 21 and rotated by the output shaft of a motor, to be more precise a motor-gearbox unit 50, through a transmission 51 incorporating a torque limiter 52.

A torque limiter 52 is associated with each pinion 48 and comprises a magnetic clutch including a magnet 53 which rotates with the pinion 58 and an armature 54 which rotates with the transmission 51.

The pinions 48 are rotatably mounted in respective bushes 55 fastened to a chassis 56 which is part of the support 21 and also carries the transmission 51.

The chassis 56 is generally trough-shape and extends diametrally under the plate 28. At each end it is attached to the plate 28 by known means that are not visible in the figures and will not be described here.

The transmission 51 is disposed under the bottom of the chassis 56.

It comprises two pinions 58 which rotate with the respective armature 54 of the respective torque limiter 52 associated with the respective pinion 48 and two intermediate gears 59 which mesh with each other and with a respective pinion 58.

One of the pinions 58 also meshes with a gear 60 rotated by the output shaft of a motor or, to be more precise, a motor-gearbox unit 62 carried by an angle-bracket 63 attached to the outside of the chassis 56.

If required, the rotation means operative between the support table 14 and the support 21 for the carriage 20 may be reduced to the rolling means constituted by the rollers 30 and the groove 29 on the plate 28.

Figure 4:
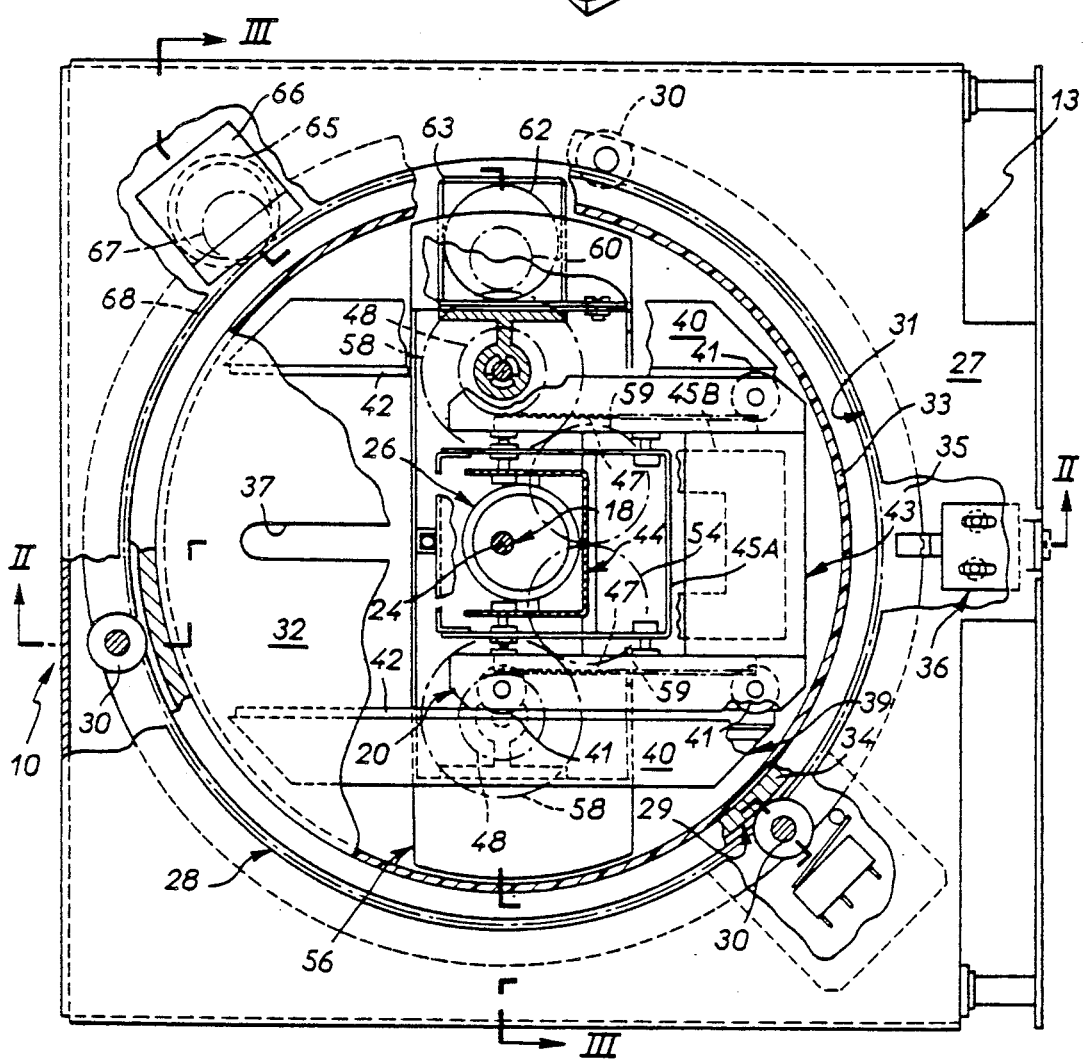
FIG. 4 is a partially cut away plan view of it as seen in the direction of the arrow IV in FIG. 2.
Figure 2:
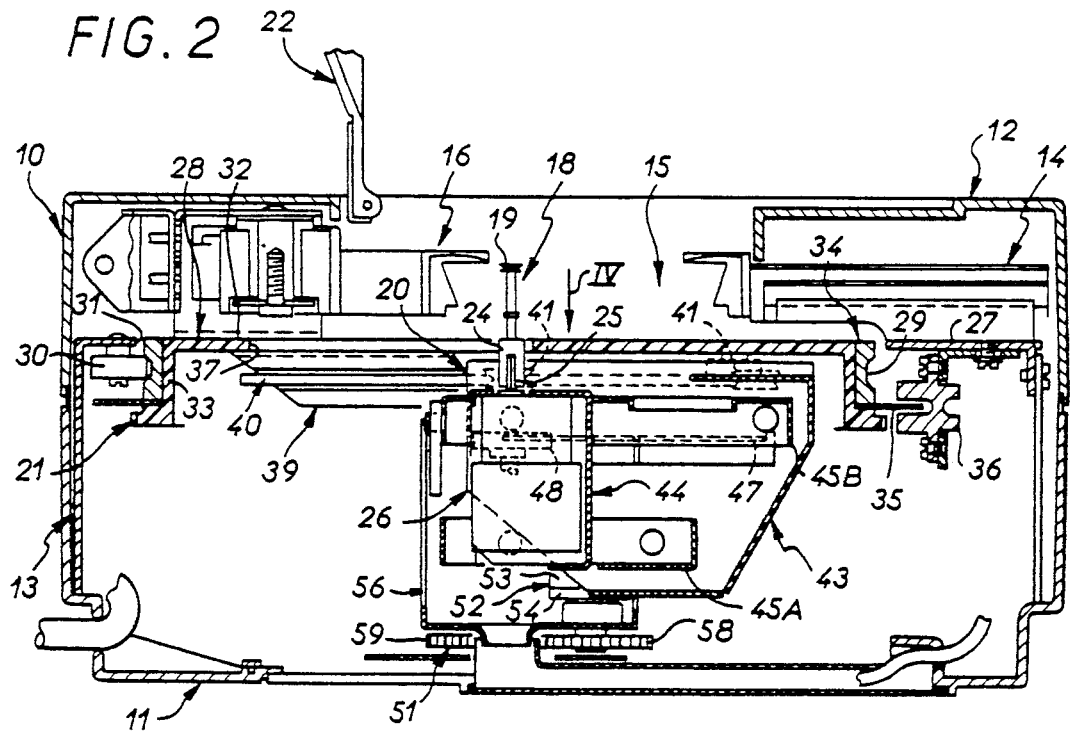
FIG. 2 is a view of it to a larger scale and in axial cross-section on the line II—II in FIG. 4.
Figure 3:
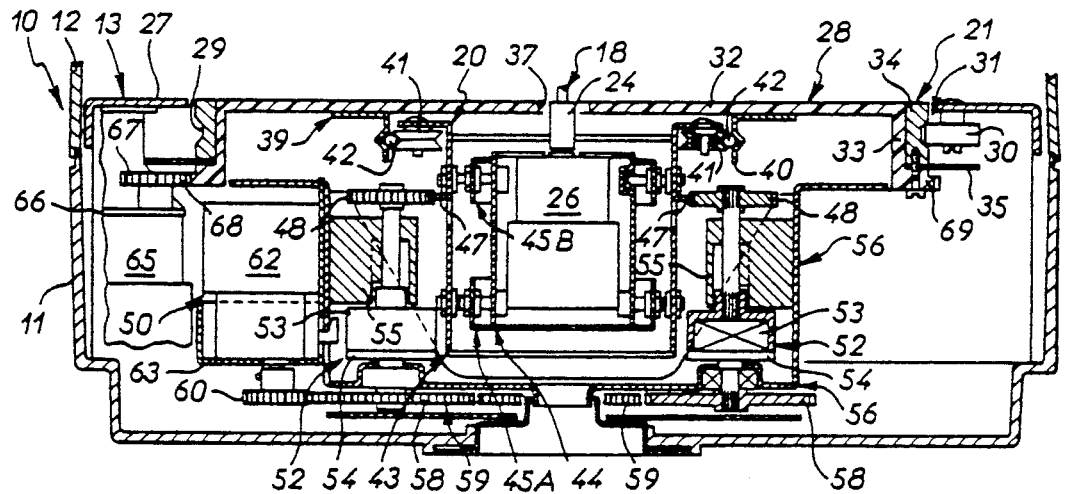
FIG. 3 is another view of it in axial cross-section on the line III—III in FIG. 4.

In the embodiment shown here, however, the rotation means further comprise a motor or, to be more precise, a motor-gearbox unit 65 (see FIGS. 3 and 4).

The motor-gearbox unit 65 is carried by an angle-bracket 66 attached to the frame 13 and its output shaft rotates a pinion 67 which meshes with a rack 68 at the periphery of the plate 28.

The rack 68 is formed on the edge of a right-angle lip 69 on the rim 33 of the central part 32 of the plate 28. To secure it, the encoder wheel 35 is gripped between the lip 69 and the peripheral part 34 of the plate 28.

In operation the contact head 19 of the feeler 18 is brought into contact with the article whose contour is to be read off, which is supported by the holding means 16 fitted to the support table 14, due to movement of the carriage 20 which carries it imparted to the carriage by the motor-gearbox unit 62.

The motor-gearbox unit 26 driving the feeler 18 and therefore the contact head 19 is started.

The contact head 19 of the feeler 18 follows the contour of the article whose contour is to be read off (provided, as is usually the case, that the coefficient of friction between it and the latter is sufficiently high) with the contact pressure controlled by the torque limiters 52.

As previously explained, the motor-gearbox unit 26 may be sufficient to rotate the plate 28 of its own accord.

However, in this embodiment the motor-gearbox unit 65 is used to this end.

The rotation speed of the contact head 19 of the feeler 18 is not critical in practice.

It is preferably greater than that of the plate 28, however.

This latter rotation speed is in the order of 5 to 10 rpm. for example.

This numerical value is given by way of non-limiting example only, of course.

As previously mentioned, the sensor 36 reads off the angular position of the support 21.

The linear position of the carriage 20 along its guide 39 is also read off, by means of an electronic rule type sensor, for example.

The polar coordinates of the feeler 18 are therefore known at all times.

The pressure with which the contact head 19 of the feeler 18 is applied to the article whose contour is to be read off is advantageously controlled by the torque limiters 52 included in the drive system of the carriage 20.

If the contact pressure exceeds a predetermined value, in the order of 60 g, for example, one or both torque limiters 52 slips to maintain this contact pressure.

In the description thus far it has been assumed that the contact head 19 of the feeler 18 is initially moved into contact with the article whose contour is to be read off by hand, entraining with it the assembly formed by the motor-gearbox unit 26 and the bracket 44 carrying the latter.

Figure 5:
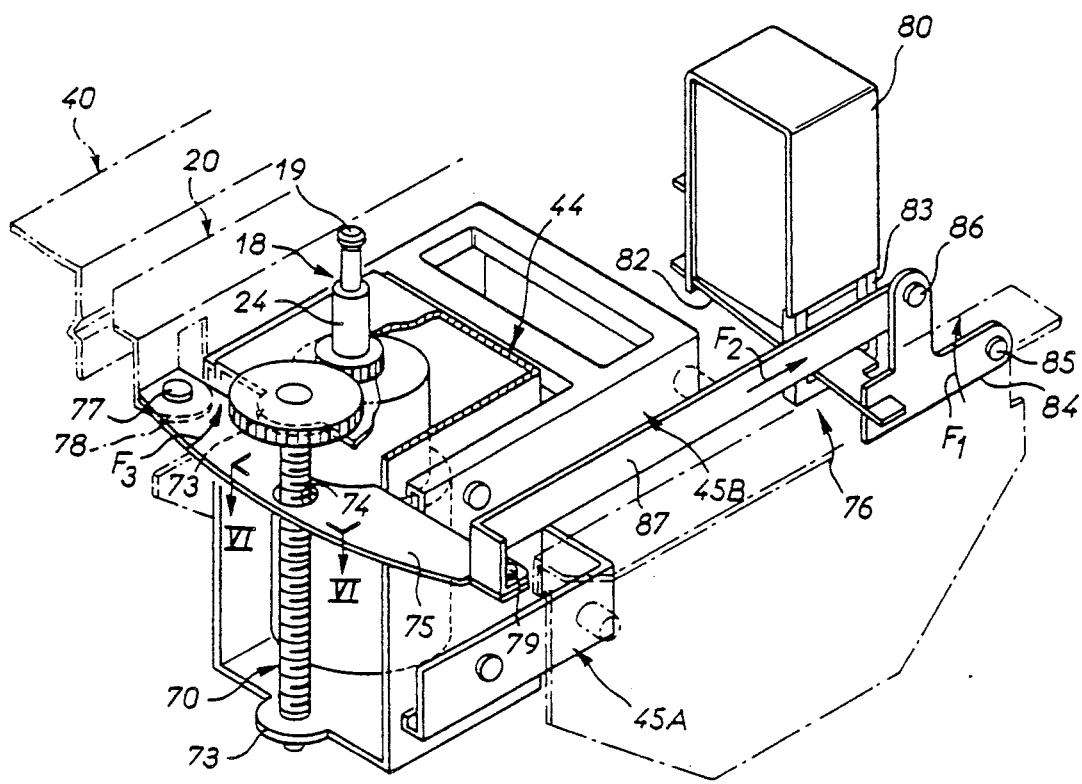
FIG. 5 is a locally cut away partial perspective view of another embodiment of the contour follower device in accordance with the invention.
Figure 6:
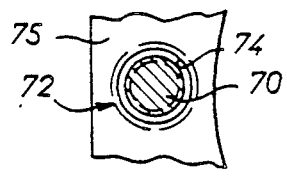
FIG. 6 is a partial plan view of it in cross-section on the line VI—VI in FIG. 5 with the clutch included in this embodiment released.
Figure 7:
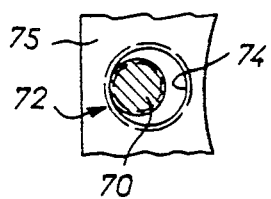
FIG. 7 is a partial plan view in cross-section analogous to that of FIG. 6 with the clutch engaged.

In the alternative embodiment shown in FIGS. 5 through 7 the presence of the motor-gearbox unit 26 is exploited to impart controlled axial movement to the feeler 18 to facilitate bringing it into contact with the article whose contour is to be read off.

To this end there is provided between the feeler 18 and the carriage 20 which carries it a screw 70 for imparting to the feeler 18 axial movement relative to the carriage 20.

Through a clutch 72 to be described in more detail later the screw 70 is rotationally coupled to the rotational drive means to which the contact head 19 of the feeler 18 is rotationally coupled.

The screw 70 is parallel to the shaft 24 of the feeler 18. It is rotatably mounted on lugs 73 attached to the motor-gearbox unit 26 forming said rotational drive means.

These two lugs 73 are in one piece with the bracket 44 carrying the motor-gearbox unit 26. for example.

They are parallel to and spaced from each other.

Between the lugs 73 the screw 70 passes with clearance through a nut 74 attached to a lever 75. A control 76 accessible to the user and to be described in more detail later controls pivoting of the lever 75 on the carriage 20 about an axis parallel to the screw 70, and so forms the clutch 72.

Here the nut 74 is formed by an appropriately screwthreaded edge on the lever 75 itself. At one end the lever 75 is articulated by a pivot 77 to a lug 78 in one piece with the carriage 20.

At its other end the lever 75 is articulated by a pivot 79 to the control 76.

The control 76 comprises an electromagnet 80 whose energization circuit includes a pushbutton (not shown) accessible to the user. Its armature 82 is guided by a stirrup member 83 through which it passes and cooperates with a crank 84 which is articulated to the carriage 20 by a pivot 85. By another 86 parallel to the pivot 85 the crank 84 is articulated to a link 87 to which the lever 75 is articulated by the pivot 79.

Beyond the lever 75, the screw 70 carries a gear 89 meshing with a gear 90 attached to the chassis 24 of the feeler 18.

When the electromagnet 80 is not energized the nut 74 is spaced from the screw 70 at all points (see FIGS. 5 and 6).

In other words, the clutch 72 that it forms with the screw 70 is then released.

The screw 70 turns synchronously with the feeler 18 but to no effect.

If the electromagnet 80 is energized its armature 82 causes the crank 84 to rotate about its fixed pivot 85 as shown by the arrow F1 in FIG. 5 and the crank 84 therefore pulls the link 87 in the direction of the arrow F2 as a result of which the lever 75 is pivoted about its fixed pivot 77 and the nut 74 that it carries is applied to one point on the screw 70 (see FIG. 7).

The clutch 72 is then engaged.

At the screw 70 is locked axially to the carriage 20, this results in axial displacement of the nut 74 along the screw 70 and therefore displacement of the bracket 44 along the axis of the feeler 18 and therefore displacement of the motor-gearbox unit 26 and the feeler 18 relative to the carriage 20.

The mobile assembly to which the feeler 18 is attached can move up or down under the control of the two linkages 45A, 45B.

Of course, the present invention is not limited to the embodiments described and shown, but encompasses any variant execution and/or implementation thereof.

In particular, the support table on which the article whose contour is to be read off is mounted can be rotatable instead of being fixed, the support carrying the carriage carrying the feeler being then fixed.

Instead of being an eyeglass frame, to be more precise one of the rims or surrounds of an eyeglass frame to which the lenses are fitted, the article whose contour is to be read off could be a template representing an eyeglass frame rim or surround, for example.

In this case the feeler obviously has to be applied to the outside of the template rather than to the inside of the rim or surround, and the relative rotation between the support table and the carriage support carrying the feeler is therefore in the opposite direction.

Finally, instead of using polar coordinates, the contour follower device in accordance with the invention could equally well use Cartesian coordinates.

We claim:

1. Contour follower device comprising a support table, holding means on said support table for supporting an article having a contour to be read off, a feeler mounted on a carriage for movement along the contour, a rotatable contact head disposed on the feeler for rolling contact with the contour, and means for positively rotatably driving the contact head.

2. Device according to claim 1, wherein said means for positively rotatably driving the contact head causes displacement of the feeler with the carriage for movement relative to said support table.

3. Device according to claim 1, further comprising torque limiter means for limiting the contact pressure between said contact head and the article.

4. Device according to claim 3, further comprising motor and transmission means for driving the carriage, said motor and transmission means including said torque limiter means.

5. Device according to claim 1, wherein said means for rotatably driving the contact head comprises a motor for rotating a shaft, the shaft rotatably mounting the contact head.

6. Device according to claim 1, wherein said carriage is mounted for reciprocating movement along a straight line path, and means for effecting rotation of said carriage relative said support table which is fixed relative to a frame.

7. Contour follower device comprising a support table, holding means on said support table for supporting an article whose contour is to be read off, a feeler, a carriage carrying said feeler and movable relative to said support table, a rotatable contact head of said feeler and drive means for rotating said contact head, a support on which said carriage is adapted to reciprocate along a straight line path, rotation means for relative rotation between said support table and said carriage and a frame to which said support table is fixed and relative to which said carriage is rotatable, said carriage support comprises a generally circular plate with a grooved edge and further comprising at least three rollers mounted rotatably on said frame along the periphery of said plate and engaged therewith.

8. Device according to claim 7 wherein said plate has a central part made from a synthetic material and from which said carriage is suspended and a peripheral part or rim which is made from metal and which includes said groove cooperating with said rollers.

9. Device according to claim 7 wherein the cross-section of said groove is trapezoid-shaped.

10. Contour follower device comprising a support table, holding means on said support table for supporting an article whose contour is to be read off, a feeler, a carriage carrying said feeler and movable relative to said support table, a rotatable contact head of said feeler and drive means for rotating said contact head, a guide cooperating with said carriage, at least one rack parallel to said guide, a pinion meshing with said rack and rotatably mounted on said support, a transmission, a motor driving said pinion through said transmission and at least one torque limiter in said transmission.

11. Device according to claim 10 wherein said torque limiter is a magnetic clutch.

12. Device according to claim 10 wherein said carriage carries two racks symmetrically disposed relative to said feeler.

13. Contour follower device comprising a support table, holding means on said support table for supporting an article whose contour is to be read off, a feeler, a carriage carrying said feeler and movable relative to said support table, a rotatable contact head of said feeler and drive means for rotating said contact head, a support on which said carriage is adapted to reciprocate along a straight line path, rotation means for relative rotation between said support table and said carriage and a frame to which said support table is fixed and relative to which said carriage is rotatable, wherein said rotation means between said support table and said carriage support comprise rolling means.

14. Device according to claim 13, wherein said rotation means between said support table and said carriage support further comprise a motor.

15. Contour follower device comprising a support table, holding means on said support table for supporting an article whose contour is to be read off, a feeler, a carriage carrying said feeler and movable relative to said support table, a rotatable contact head of said feeler and drive means for rotating said contact head, a screw operative between said feeler and said carriage and adapted to move said feeler axially relative to said carriage and a clutch whereby said screw is adapted to be rotated by said drive means adapted to rotate said contact head.

16. Device according to claim 15 comprising a shaft parallel to said screw and carrying said contact head, a motor carried by said carriage and adapted to rotate said shaft, the motor constituting the contact head rotational drive means, lugs on said motor on which said screw is rotatably mounted, a nut through which said screw passes with clearance, a lever carrying said nut and pivoted to said carriage about an axis parallel to said screw to form said clutch, and a control member accessible to the user controller pivoting of said lever.

17. Device according to claim 16 characterized in that said nut is formed by an edge of said lever.

* * * * *